(12) United States Patent
Buzniak

(10) Patent No.: US 12,061,357 B2
(45) Date of Patent: Aug. 13, 2024

(54) PLASTIC WAVELENGTH SHIFTING FIBER AND A METHOD OF MAKING THE SAME

(71) Applicant: SAINT-GOBAIN CERAMICS & PLASTICS, INC., Worcester, MA (US)

(72) Inventor: Jan J. Buzniak, Solon, OH (US)

(73) Assignee: LUXIUM SOLUTIONS, LLC, Hiram, OH (US)

( * ) Notice: Subject to any disclaimer, the term of this patent is extended or adjusted under 35 U.S.C. 154(b) by 298 days.

(21) Appl. No.: 16/941,016

(22) Filed: Jul. 28, 2020

(65) Prior Publication Data

US 2021/0033783 A1   Feb. 4, 2021

Related U.S. Application Data

(60) Provisional application No. 62/880,036, filed on Jul. 29, 2019.

(51) Int. Cl.
*G02B 6/02* (2006.01)
*B29D 11/00* (2006.01)
*G01T 1/20* (2006.01)

(52) U.S. Cl.
CPC .... *G02B 6/02033* (2013.01); *B29D 11/00663* (2013.01); *B29D 11/00875* (2013.01); *G01T 1/2002* (2013.01); *G01T 1/20185* (2020.05)

(58) Field of Classification Search
None
See application file for complete search history.

(56) References Cited

U.S. PATENT DOCUMENTS

| | | | |
|---|---|---|---|
| 4,788,436 A | | 11/1988 | Koechner |
| 5,168,540 A | | 12/1992 | Winn et al. |
| 5,588,084 A | | 12/1996 | Johnson |
| 5,684,907 A | * | 11/1997 | Sprehn .................. G02B 6/02 385/125 |
| 6,271,510 B1 | | 8/2001 | Boxen |

(Continued)

FOREIGN PATENT DOCUMENTS

| | | |
|---|---|---|
| EP | 0107532 A1 | 5/1984 |
| EP | 3474042 A1 | 4/2019 |

(Continued)

OTHER PUBLICATIONS

Alfieri, C. et al., "A set-up to measure the optical attenuation length of scintillating fibres," CERN, European Organization for Nuclear Research, publication LHCb-PUB-2015-011, May 12, 2015, 9 pages.

(Continued)

*Primary Examiner* — Rhonda S Peace
(74) *Attorney, Agent, or Firm* — ABEL SCHILLINGER, LLP; John M. Frank

(57) ABSTRACT

A wavelength shifting fiber and method of making the same is disclosed. A wavelength shifting fiber can include a plastic core and a coating surrounding the plastic core. The numerical aperture for the wavelength shifting fiber can be at least about 0.53. A method of making a wavelength shifting fiber can include heating and drawing a plastic core precursor to form a plastic core, coating the plastic core with a liquid coating, and curing the liquid coating around the plastic core to form a wavelength shifting fiber.

17 Claims, 3 Drawing Sheets

(56) References Cited

U.S. PATENT DOCUMENTS

| | | | |
|---|---|---|---|
| 6,908,576 B2 | 6/2005 | Saito et al. | |
| 7,054,408 B2 | 5/2006 | Jiang et al. | |
| 8,419,293 B2* | 4/2013 | Zerfas | G02B 23/26 |
| | | | 385/124 |
| 8,483,532 B2* | 7/2013 | Sohma | G02B 6/02033 |
| | | | 385/128 |
| 9,611,168 B2 | 4/2017 | Morse et al. | |
| 11,226,420 B2* | 1/2022 | Shinji | G01T 1/00 |
| 2010/0047479 A1* | 2/2010 | Voeltz | C09K 19/54 |
| | | | 252/299.01 |
| 2011/0105636 A1* | 5/2011 | Kim | C08G 18/6492 |
| | | | 521/163 |
| 2013/0125111 A1 | 5/2013 | Michielsens et al. | |
| 2013/0208857 A1 | 8/2013 | Arodzero et al. | |
| 2020/0191980 A1* | 6/2020 | Shinji | G02B 6/03694 |
| 2021/0033783 A1* | 2/2021 | Buzniak | B29D 11/00663 |

FOREIGN PATENT DOCUMENTS

| | | |
|---|---|---|
| JP | H03-251804 A | 11/1991 |
| JP | 2005326762 A | 11/2005 |
| JP | 2010091555 A | 4/2010 |
| JP | 5588084 B1 | 9/2014 |
| JP | 5684907 B2 | 3/2015 |
| JP | 2018200172 A | 12/2018 |
| KR | 10-20140123996 A | 10/2014 |
| WO | 2015056025 A1 | 4/2015 |
| WO | 2018043383 A1 | 3/2018 |

OTHER PUBLICATIONS

International Search Report and Written Opinion for PCT/US2020/043874, mailed Nov. 9, 2020, 11 pages.

Extended European Search Report for EP Application No. 20847230.8, dated Jun. 26, 2023, pp. 1-15.

Anonymous: "Numerical Aperture," Wikipedia the Free Encyclopedia, Jun. 13, 2023, pp. 1-6, XP093053812, <https://en.wikipedia.org/wiki/Numerical_aperture>.

* cited by examiner

PLASTIC WAVELENGTH SHIFTING FIBER AND A METHOD OF MAKING THE SAME

CROSS-REFERENCE TO RELATED APPLICATION(S)

This application claims priority under 35 U.S.C § 119(e) to U.S. Provisional Application No. 62/880,036, entitled "PLASTIC WAVELENGTH SHIFTING FIBER AND A METHOD OF MAKING THE SAME," by Jan J. BUZ-NIAK, filed Jul. 29, 2019, which is assigned to the current assignee hereof and is incorporated herein by reference in its entirety.

FIELD OF THE DISCLOSURE

The present disclosure is directed to scintillating articles and methods of forming the same, and more particularly to plastic wavelength shifting fibers with an optical waveguide.

BACKGROUND

Radiation detection apparatuses are used in a variety of applications. For example, scintillators can be used for medical imaging and for well logging in the oil and gas industry as well for the environment monitoring, security applications, and for nuclear physics analysis and applications. Manufacturing wavelength shifting fibers has traditionally been limited by the properties of the materials used and thus can be quite challenging. Further improvements for manufacturing wavelength shifting fibers are desired.

BRIEF DESCRIPTION OF THE DRAWINGS

Embodiments are illustrated by way of example and are not limited in the accompanying figures.

Figure 1:
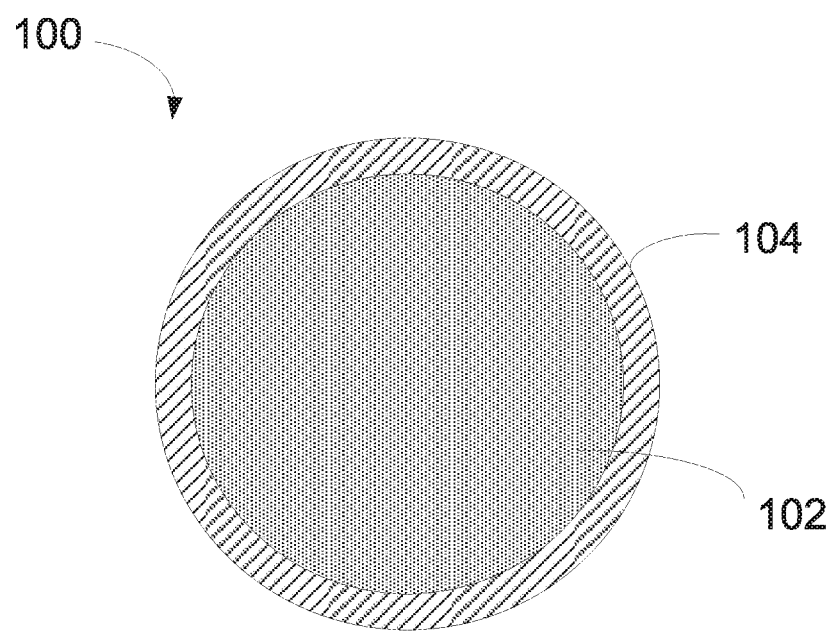
FIG. 1 shows an illustration of cross-sectional view of a plastic wavelength shifting fiber in accordance with one embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, group numbers corresponding to columns within the Periodic Table of the elements use the "New Notation" convention as seen in the CRC Handbook of Chemistry and Physics, 81$^{st}$ Edition (2000-2001).

An optical attenuation length of a wavelength shifting fiber characterizes and relates directly to the quantity of detectable light at the end of the fiber. The optical attenuation length is measured on an optical bench that holds and supports a wavelength shifting fiber. The optical bench includes a rail onto which are mounted: (1) a UV-Vis photodiode; (2) an excitation cavity; and (3) a mechanical holder to support the back end of the fiber. The front end of the wavelength shifting fiber is attached to a UV-Vis photodiode. The excitation cavity uses uniformly spaced 390 nm LEDs and a phototransistor to measure the strength of the excitation light. The cavity is mounted on a carriage which moves on the optical rail. The position of the carriage can be read on a scale attached to the optical bench rail with a precision of better than ±5 mm. Details of the setup and operation of the optical bench are described in CERN (European Organization for Nuclear Research) publication LHCb-PUB-2015-011 which is titled "A set-up to measure the optical attenuation length of scintillating fibers" and was published on May 12, 2015.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A wavelength shifting fiber can include a plastic core and a coating surrounding the plastic core to improve transmission of light along the fiber, and ultimately increase the amount of light that can reach a radiation detector containing the wavelength shifting fiber.

In an embodiment, the wavelength shifting fiber may contain a polymerized, solid plastic scintillation core and a cladding surrounding the core with a numerical aperture for the wavelength shifting fiber of at least 0.53. The larger the numerical aperture, the more light is able to be detected in a detector. By containing more light within the core, the wavelength shifting fiber enables more light to ultimately reach a detector, enhancing output. A high numerical aperture is difficult to obtain. Moreover, the materials selected for the core and the cladding have traditionally been limited as both need to have similar melting points and thermal properties to be drawn at the same time thereby limiting the numerical aperture of the wavelength shifting fiber. The selection of a particular cladding may depend on the particular scintillation properties that are desired. Additionally, contaminants—such as lubricating aids or dust particles—interfere with the transmission of photons along the length of the fiber, further adding to the loss of light. As used in this specification, a cladding can include two or more different elements or layers.

Any of the wavelength shifting fibers as described below can be used in a variety of applications. Exemplary applications include gamma ray spectroscopy, isotope identification, Single Photon Emission Computer Tomography (SPECT) or Positron Emission Tomography (PET) analysis, x-ray imaging, oil well-logging detectors, medical imaging devices, network communications device, high energy physics, small detectors, network communications, broadcast receivers, wireless transmissions, augmented reality devices, broadcasting networks, and detecting the presence of radioactivity. The wavelength shifting fiber can be used for other applications, and thus, the list is merely exemplary and not limiting. A couple of specific applications are described below.

Embodiments described below and illustrated are provided to aid in understand the concepts as set forth herein. The embodiments are merely illustrative and not intended to limit the scope of the present invention, as set forth in the appended claims.

FIG. 1 shows an illustration of a plastic wavelength shifting fiber 100 in accordance with one embodiment. The plastic wavelength shifting fiber 100 can include a core 102 and a cladding 104. In one embodiment, the cladding 104 can be formed by coating and can thereby be referred to as a coating. In one embodiment, the core 102 can be a plastic core. The core 102 can include a material selected from the group consisting of polystyrene (PS), polyvinyltoluene (PVT), and polymethyl methacrylate (PMMA), polycarbonate, and any combination thereof. In one embodiment, the core 102 can include a fluorescent dopant. The core 102 may be various geometric shapes such as round, square, triangular, polygonal, or hexagonal. The core 102 may have a diameter of 0.01 mm to 5 mm. In one embodiment, the core 102 may have a diameter of at least 0.01 mm, such as a diameter of 0.1 mm, or a diameter of 0.2 mm, or a diameter of 0.5 mm, or a diameter of 1 mm, or a diameter of 2 mm. In one embodiment, the core 102 may have a diameter of at most 5 mm, such as at most 4.5 mm, or at most 4 mm, or at most 3.5 mm.

The coating 104 may surround the core 102. In one embodiment, the coating 104 may surround the entire core 102. In one embodiment, the coating 104 can be in direct contact with the core 102. In one embodiment, the coating 104 can be in direct contact with the core 102 without any intervening material, for example lubricants, in between. In one embodiment, the coating 104 can include a single layer. In another embodiment, the coating 104 can include at least two layers. In one embodiment, the at least two layers of the coating 104 can have different composition of materials. In another embodiment, the at least two layers of the coating 104 can be the same material. In yet another embodiment, the at least two layers of the coating 104 can be different materials. The coating 104 can include an organic material. In one embodiment, the coating 104 can include a material selected from glycerol ether acrylate, methacrylated polymer, fluoroacrylate, multifunctional acrylate, or a combination thereof. In another embodiment, the coating 104 can include a dopant. In another embodiment, the coating 104 can include an additive to make the coating 104 more reflective.

In one embodiment, the coating 104 can have the same shape as the core 102. In another embodiment, the coating 104 can have a different shape from the core 102. For example, in one embodiment the core 102 may be circular and the coating 104 may be square. In another embodiment, the coating 104 can be a liquid coating that can be radiation cured. In one embodiment, the coating 104 can be a radiation cured coating. In one embodiment, the coating 104 can be an ultra violet cured coating. In one embodiment, the coating 104 can be a thermal cured coating. In one embodiment the coating 104 can have a thickness of between about 3 µm to about 1 mm. In one embodiment, the coating 104 can have a thickness of at least 3 µm, such as a thickness of 25 µm, or such as 50 µm, or such as 75 µm, or such as 100 µm, or such as 500 µm. In one embodiment, the coating 104 can have a thickness of at most 600 µm, such as a thickness of 700 µm, or such as 800 µm, or such as 1 mm. The plastic fiber 100 can have a numerical aperture of at least 0.53, such as a numerical aperture of at least 0.6, or a numerical aperture of at least 0.7. In one embodiment, the plastic fiber 100 can be a wavelength shifting fiber.

Figure 2:
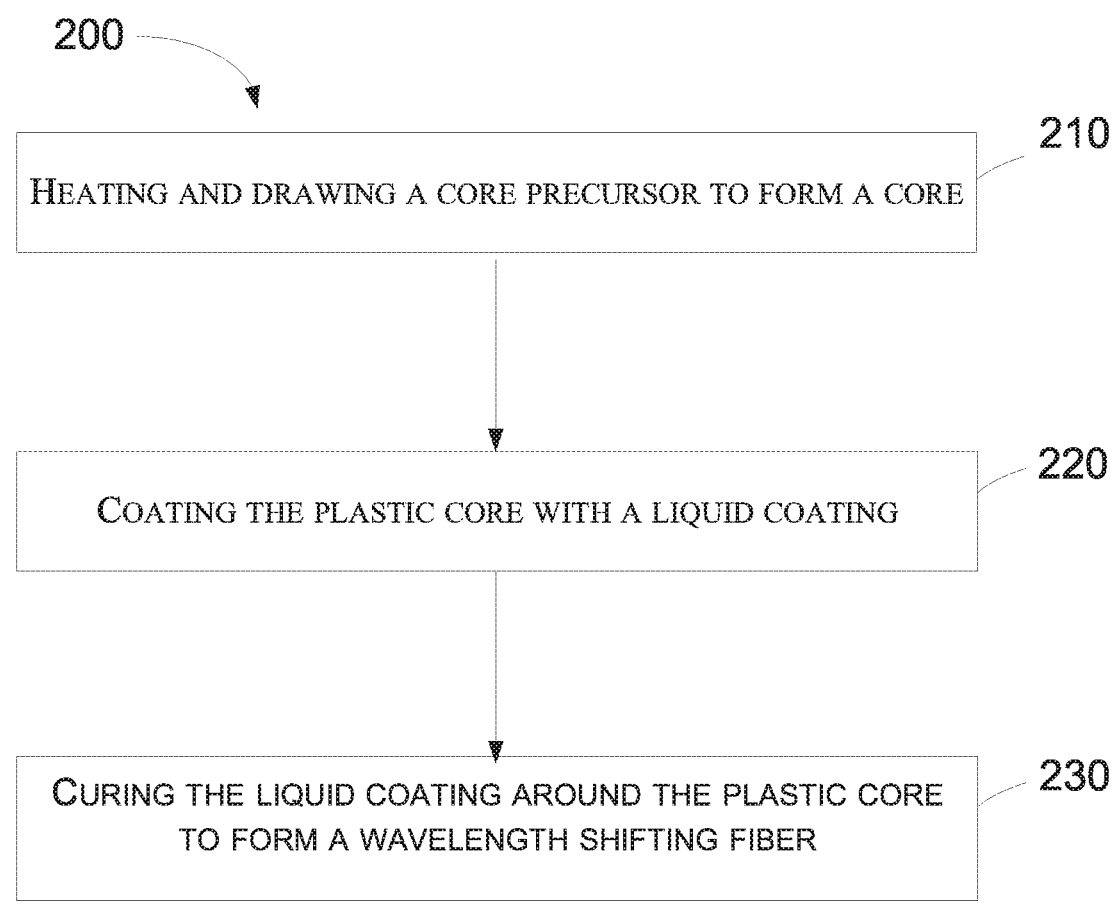
FIG. 2 shows a method of manufacturing a wavelength shifting fiber in accordance with one embodiment.

FIG. 2 shows a method 200 of manufacturing the wavelength shifting fiber 100 in accordance with one embodiment. In one embodiment, the wavelength shifting fiber 100 can be a scintillation fiber. In one embodiment, a mixture that can include a liquid monomer and scintillating additives is polymerized to form the core precursor. In one embodiment, the core precursor can be a plastic core precursor. In one embodiment, the core precursor can include a material selected from the group consisting of polystyrene (PS), polyvinyltoluene (PVT), and polymethyl methacrylate (PMMA), polycarbonate and any combination thereof. In one embodiment, the core precursor can include a fluorescent dopant. In one embodiment, the polymerization can be done in geometric shaping tubes. For example, in one embodiment, the polymerization can be done in a cylindrical tube to form a round scintillating core. In one embodiment, the core precursor can have a refractive index of less than 1.60, such as a refractive index of less than 1.59, or a refractive index of less than 1.57, or a refractive index of less than 1.55, or a refractive index of less than 1.50. In one embodiment, the core precursor can have a refractive index of greater than 0.2.

At operation 210, the core precursor can be heated and drawn out to form a core. In one embodiment, the core can be a plastic core. In one embodiment, the plastic core can be similar to core 102 described above. In one embodiment, the plastic core can have a diameter of greater than 8 mm, such as a diameter greater than 10 mm, or greater than 12 mm. In one embodiment, the plastic core precursor can have a larger diameter than the plastic core. In one embodiment, the core precursor can be heated to a temperature greater than 240° C., such as a temperature greater than 260° C., or greater than 270° C., or greater than 300° C.

At operation 220, the plastic core can be coated with a liquid coating. In one embodiment, the liquid coating can include a material selected from glycerol ether acrylate, methacrylated polymer, fluoroacrylate, multifunctional acrylate, or a combination thereof. In another embodiment, the liquid coating can include a dopant. In another embodiment, the liquid coating can include an additive to increase the reflectance of the liquid coating. In one embodiment, the liquid coating can have a melting point that is different from the core precursor. In one embodiment, the liquid coating can have a melting point that is at least 80 degrees Celsius higher than the melting point for the core precursor, such as a melting point that is at least 100 degrees Celsius higher than the melting point for the core precursor, or at least 150 degrees Celsius higher. In one embodiment, the liquid coating can have a melting point that is greater than 250° C., such as a melting point that is greater than 300° C., or greater than 350° C., or greater than 400° C., or greater than 500° C. In one embodiment, the liquid coating can have a refractive index of less than 1.50, such as a refractive index of less than 1.48, or a refractive index of less than 1.45, or refractive index of less than 1.42, or refractive index of less than 1.40, or refractive index of less than 1.35.

At operation 230, the liquid coating surrounding the plastic core can be cured to form a wavelength shifting fiber. In one embodiment, the liquid coating surrounding the plastic core can be cured to form a protective cladding after the plastic core has been shaped to its final length. In one embodiment, the liquid coating can be applied to the plastic core without the addition of heat. In one embodiment, the liquid coating can be applied directly to the plastic core such that there is no intervening substance between the liquid coating and the plastic core. In one embodiment, the liquid coating can be cured using radiation. In one embodiment, the liquid coating can be cured using ultra violet radiation. In another embodiment, the liquid coating can be cured using thermal radiation. The liquid coating may be cured for a period of no greater than 30 seconds, such as less than 5 seconds, or less than 3 seconds, or less than 1 second, or less than 0.5 seconds. In one embodiment, a second liquid coating may be applied to the first liquid coating after the first liquid coating has been cured. Where more than one liquid coating is applied, each coating may be cured separately. In one embodiment, the first liquid coating may be cured for a shorter period of time than the second liquid coating. In one embodiment, more than one liquid coating may be applied to the plastic core. For example, more than two liquid coatings may be applied to the plastic core. In one embodiment, the first liquid coating may be different than the second liquid coating. In another embodiment, the first liquid coating may be thinner than the second liquid coating. In yet another embodiment, the first liquid coating may be thicker than the second liquid coating. In another embodiment, the first liquid coating may have the same thickness as the second liquid coating. In yet another embodiment, the first liquid coating may be cured using a different type of radiation than the second liquid coating. In one embodiment, the more than one liquid coatings may be applied after the plastic core has been heated and drawn to its final length. Applying the liquid coating on the plastic core directly eliminates dust build up that can accumulate between a traditional core and cladding method. The dust or contamination trapped in a traditional core and cladding interface can degrade the transmission of light along the fiber. However, by applying and curing the liquid coating directly on the plastic core, the wavelength shifting fiber has an increased efficiency of transmission of light along the fiber.

After the wavelength shifting fiber is formed, the wavelength shifting fiber may have a numerical aperture of at least 0.53. In one embodiment, the wavelength shifting fiber may have a numerical aperture of at least 0.6, such as at least 0.7. The numerical aperture is defined by the formula $NA = \sqrt{(n_{core})^2 - (n_{clad})^2}$, where $n_{core}$ is the refractive index of the plastic core and $n_{clad}$ is the refractive index of the coating as measured at 25° C. a wavelength of 589 nm. The larger the numerical aperture, the more light is able to be detected in a detector. By containing more light within the core, the wavelength shifting fiber enables more light to ultimately reach a detector, enhancing output. In one embodiment, the wavelength shifting fiber can have an optical attenuation length of at least 3 meters, such as at least 4 meters, or at least 5 meters. In one embodiment, the wavelength shifting fiber can have an optical attenuation length of less than 10 meters, such as less then 9 meters, or less than 8 meters, or less than 7 meters.

Figure 3:
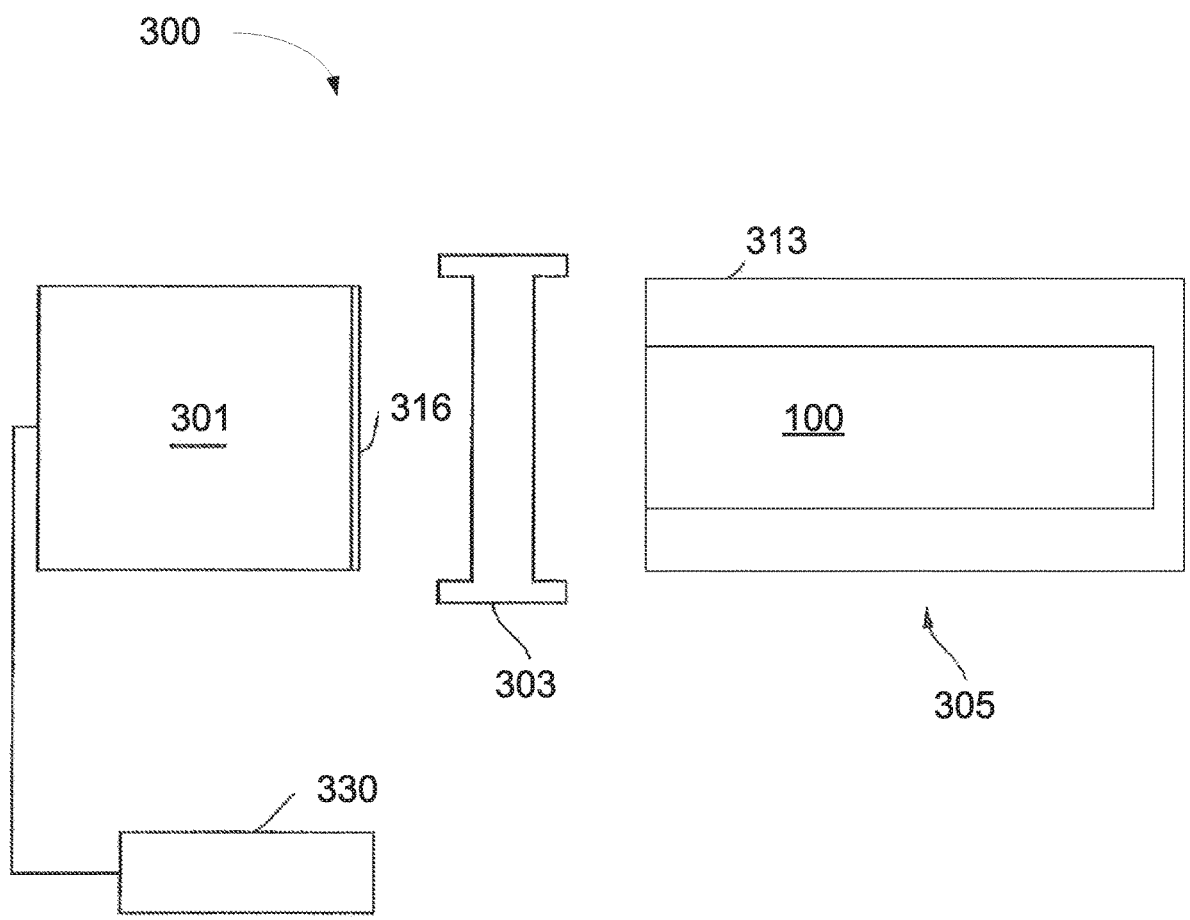
FIG. 3 includes an illustration of an end view of an article that includes a body and wavelength shifting fiber in accordance with still another embodiment.

FIG. 3 illustrates an embodiment of a radiation detection apparatus 300 that can be used for gamma ray analysis, such as Single Photon Emission Computer Tomography (SPECT) or step-through X-ray machine. As shown in FIG. 3 and in accordance with embodiments described herein, the radiation detection apparatus 300 may include a photosensor 301, an optical interface 303, and a scintillation device 305. Although the photosensor 301, the optical interface 303, and the scintillation device 305 are illustrated in FIG. 3 as being separate from each other, it will be appreciated that, according to certain embodiments, photosensor 301 and the scintillation device 305 can be coupled to the optical interface 303, with the optical interface 303 disposed between the photosensor 301 and the scintillation device 305. According to still other embodiments, the scintillation device 300 and the photosensor 301 can be optically coupled to the optical interface 303 with other known coupling methods, such as the use of an optical gel or bonding agent, or directly through molecular adhesion of optically coupled elements.

According to yet other embodiments, the photosensor 301 may be a photomultiplier tube (PMT), a semiconductor-based photomultiplier, a hybrid photosensor, avalanche photodiodes, or a combination thereof. As used herein, a semiconductor-based photomultiplier in intended to mean a photomultiplier that includes a plurality of photodiodes, wherein each of the photodiodes have a cell size less than 1 mm, and the photodiodes are operated in Geiger mode. In practice, the semiconductor-based photomultiplier can include over a thousand photodiodes, wherein each photodiode has a cell size in a range of 10 microns to 100 microns and a fixed gain. The output of the semiconductor-based photomultiplier is the sum signal of all Geiger mode photodiodes. The semiconductor-based photomultiplier can include silicon photomultiplier (SiPM) or a photomultiplier based on another semiconductor material. For a higher temperature application (e.g., higher than 125° C.), the other semiconductor material can have a wider bandgap energy than silicon. An exemplary material can include SiC, a Ga-Group V compound (e.g., GaN, GaP, $Ga_2O_3$, or GaAs), or the like. An avalanche photodiode has a larger size, such as a light-receiving area of at least 1 $mm^2$ and is operated in a proportional mode.

The photosensor 301 can receive photons emitted by the scintillation device 305, via an input window 316, and produce electrical pulses based on numbers of photons that it receives. The photosensor 301 is electrically coupled to an electronics module 330. The electrical pulses can be shaped, digitized, analyzed, or any combination thereof by the electronics module 330 to provide a count of the photons received at the photosensor 301 or other information. The electronics module 330 can include an amplifier, a pre-amplifier, a discriminator, an analog-to-digital signal converter, a photon counter, a pulse shape analyzer or discriminator, another electronic component, or any combination thereof. The photosensor 301 can be housed within a tube or housing made of a material capable of protecting the photosensor 301, the electronics module 330, or a combination thereof, such as a metal, metal alloy, other material, or any combination thereof.

The scintillation device 305 may include a wavelength shifting fiber as previously described, such as wavelength shifting fiber 100. The scintillation device 305 can be included within a larger system such as a gamma ray spectroscopy device, isotope identification device, Single Photon Emission Computer Tomography (SPECT) device, Positron Emission Tomography (PET) analysis device, x-ray imaging device, oil well-logging detectors, medical imaging devices, network communications device, small detectors, network communication devices, broadcast receivers, wireless transmissions devices, augmented reality devices, and broadcasting network systems. The wavelength shifting fiber 100 may be substantially surrounded by a casing 313. The scintillation device 305 may include at least one stabilization mechanism adapted to reduce relative movement between the wavelength shifting fiber 100 and other elements of the radiation detection apparatus 300, such as the optical interface 303, the casing 313, or any combination thereof.

The optical interface 303 may be adapted to be coupled between the photosensor 301 and the scintillation device 305. The optical interface 303 may also be adapted to facilitate optical coupling between the photosensor 301 and the scintillation device 305. The optical interface 303 can include a polymer, such as a silicone rubber, that is polarized to align the reflective indices of the wavelength shifting fiber 100 and the input window 316. In other embodiments, the optical interface 303 can include gels or colloids that include polymers and additional elements.

The concepts as described in this specification are not limited to the particular application previously described. The radiation detector can be configured for another type of radiation. Many different aspects and embodiments are possible. Some of those aspects and embodiments are described herein. Embodiments may be in accordance with any one or more of the embodiments as listed below.

Embodiment 1. A wavelength shifting fiber can include a plastic core and a coating surrounding the plastic core. The numerical aperture for the wavelength shifting fiber can be at least about 0.53.

Embodiment 2. The wavelength shifting fiber of Embodiment 1, where the numerical aperture is defined by the formula $NA=\sqrt{(n_{core})^2-(n_{clad})^2}$, where $n_{core}$ is a refractive index of the plastic core and $n_{clad}$ is a refractive index of the coating.

Embodiment 3. The wavelength shifting fiber of Embodiment 1, where the numerical aperture for the wavelength shifting fiber can be at least about 0.6.

Embodiment 4. The wavelength shifting fiber of Embodiment 1, where the numerical aperture for the wavelength shifting fiber can be at least about 0.7.

Embodiment 5. The wavelength shifting fiber of Embodiment 1, wherein the coating has a thickness of at least 3 µm, such as a thickness of 25 µm, or such as 50 µm, or such as 75 µm, or such as 100 µm, or such as 500 µm.

Embodiment 6. The wavelength shifting fiber of Embodiment 1, where the coating surrounding the plastic core is a radiation cured coating.

Embodiment 7. The wavelength shifting fiber of Embodiment 6, where the radiation cured coating can be a UV cured coating.

Embodiment 8. The wavelength shifting fiber of Embodiment 1, where the plastic core can include a material selected from the group consisting of polystyrene (PS), polyvinyltoluene (PVT), polymethyl methacrylate (PMMA), polycarbonate, and any combination thereof.

Embodiment 9. The wavelength shifting fiber of Embodiment 8, where the plastic core can include a fluorescent dopant.

Embodiment 10. The wavelength shifting fiber of Embodiment 1, where the coating can include an organic material.

Embodiment 11. The wavelength shifting fiber of Embodiment 1, where the plastic core can have a diameter of at least about 0.01 mm and not greater than about 5 mm.

Embodiment 12. The wavelength shifting fiber of Embodiment 10, where the coating can include glycerol ether acrylate, methacrylated polymer, fluoroacrylate, multifunctional acrylate, or a combination thereof.

Embodiment 13. A method of making a wavelength shifting fiber can include heating and drawing a plastic core precursor to form a plastic core, coating the plastic core with a liquid coating, and curing the liquid coating around the plastic core to form a wavelength shifting fiber.

Embodiment 14. The method of making a wavelength shifting fiber of Embodiment 13, where the liquid coating around the plastic core can be cured using ultra violet (UV) radiation.

Embodiment 15. The method of making a wavelength shifting fiber of Embodiment 13, where the liquid coating around the plastic core can be cured in less than 30 seconds, such as less than 5 seconds, or less than 3 seconds, or less than 0.5 seconds.

Embodiment 16. The method of making a wavelength shifting fiber of Embodiment 13, where the wavelength shifting fiber can include a numerical aperture at least about 0.53, where the numerical aperture is defined by the formula $NA=\sqrt{(n_{core})^2-(n_{clad})^2}$, where $n_{core}$ is a refractive index of the plastic core and $n_{clad}$ is a refractive index of the coating.

Embodiment 17. The method of making a wavelength shifting fiber of Embodiment 16, where the numerical aperture for the wavelength shifting fiber can be at least about 0.6.

Embodiment 18. The method of making a wavelength shifting fiber of Embodiment 16, where the numerical aperture for the wavelength shifting fiber can be at least about 0.7.

Embodiment 19. The method of making a wavelength shifting fiber of Embodiment 13, where the plastic core can include a material selected from the group consisting of polystyrene (PS), polyvinyltoluene (PVT), polymethyl methacrylate (PMMA), polycarbonate, and any combination thereof.

Embodiment 20. The method of making a wavelength shifting fiber of Embodiment 13, where the plastic core precursor can be heated above 240° C.

Embodiment 21. The method of making a wavelength shifting fiber of Embodiment 13, where the method further can include applying a second liquid coating on the liquid coating after the liquid coating has been cured and curing the second liquid coating.

Embodiment 22. A method of making a wavelength shifting fiber, where the method can include polymerizing a mixture of at least a liquid monomer and a scintillating additive to form a plastic core precursor, heating and drawing the plastic core precursor to form a plastic core, applying a liquid coating around the plastic core, and curing the liquid coating around the plastic core to form a wavelength shifting fiber.

Embodiment 23. A wavelength shifting fiber including a plastic core and a coating surrounding the plastic core, wherein a numerical aperture for the wavelength shifting fiber is at least about 0.53, and wherein an optical attenuation length for the wavelength shifting fiber is at least 3 meters, such as at least 4 meters, or at least 5 meters.

Embodiment 24. The wavelength shifting fiber of Embodiment 23, where an optical attenuation length of the wavelength shifting fiber is no greater than 10 meters.

Examples

Doped Polystyrene precursor rod was feed into 240° C. drawing oven at rate of 3 mm/min and drawn into 1 mm fiber diameter. Fiber diameter was controlled using commercially available multi-axis laser diameter controller. Coating process started immediately after reaching diameter tolerance of +/−0.010 mm. Coating die was filled with preheated to 35° C., commercially available DeSolite UV acrylic resin. Immediate following coating process, the coated fiber was cured in commercially available 100 W/cm UV curing oven and spooled into 24" diameter spool to form a wavelength shifting fiber. The wavelength shifting fiber was measured to have a numerical aperture (NA) of 0.53.

Embodiments as described in this specification can allow for relatively large radiation detectors that can be used for inspecting cargo, vehicles, or other large objects, as well as research on high energy physics, medical imaging, small detectors, network communications, broadcast receivers, wireless transmissions, augmented reality devices, and broadcasting networks. Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A wavelength shifting fiber, comprising:
   a plastic core; and
   a cladding surrounding the plastic core, wherein a numerical aperture for the wavelength shifting fiber is at least about 0.53, wherein the cladding comprises glycerol ether acrylate, methacrylated polymer, fluoroacrylate, multifunctional acrylate, or a combination thereof and wherein the cladding surrounding the plastic core is a UV cured liquid cladding, wherein the cladding is in direct contact with the plastic core.

2. The wavelength shifting fiber of claim 1, wherein the numerical aperture is defined by the formula $NA=\sqrt{(n_{core})^2-(n_{clad})^2}$, wherein $n_{core}$ is a refractive index of the plastic core and $n_{clad}$ is a refractive index of the cladding.

3. The wavelength shifting fiber of claim 1, wherein the numerical aperture for the wavelength shifting fiber is at least about 0.6.

4. The wavelength shifting fiber of claim 1, wherein the numerical aperture for the wavelength shifting fiber is at least about 0.7.

5. The wavelength shifting fiber of claim 1, wherein the cladding has a thickness of at least 3 μm.

6. The wavelength shifting fiber of claim 1, wherein the cladding is in direct contact with the core without any intervening substances in between.

7. The wavelength shifting fiber of claim 1, wherein the plastic core comprises a material selected from the group consisting of polystyrene (PS), polyvinyltoluene (PVT), polymethyl methacrylate (PMMA), polycarbonate, and any combination thereof.

8. The wavelength shifting fiber of claim 7, wherein the plastic core comprises a fluorescent dopant.

9. The wavelength shifting fiber of claim 1, wherein the cladding comprises an organic material.

10. The wavelength shifting fiber of claim 1, wherein the plastic core has a diameter of at least about 0.01 mm and not greater than about 5 mm.

11. A wavelength shifting fiber, comprising:
    a plastic core; and
    a cladding surrounding the plastic core, wherein a numerical aperture for the wavelength shifting fiber is at least about 0.53, and wherein an optical attenuation length for the wavelength shifting fiber is at least 3 meters, wherein the cladding comprises glycerol ether acrylate, methacrylated polymer, fluoroacrylate, multifunctional acrylate, or a combination thereof and wherein the cladding surrounding the plastic core is a UV cured liquid cladding, wherein the cladding is in direct contact with the plastic core.

12. A method of making a wavelength shifting fiber, wherein the method comprises:
    heating and drawing a plastic core precursor to form a plastic core;
    coating the plastic core with a liquid coating; and
    curing the liquid coating around the plastic core to form a wavelength shifting fiber, wherein the liquid coating around the plastic core is cured using ultra violet (UV) radiation, wherein the cladding is in direct contact with the plastic core.

13. The method of making the wavelength shifting fiber of claim 12, wherein the wavelength shifting fiber comprises a numerical aperture at least about 0.53, wherein the numerical aperture is defined by the formula $NA=\sqrt{(n_{core})^2-(n_{clad})^2}$, wherein $n_{core}$ is a refractive index of the plastic core and $n_{clad}$ is a refractive index of the coating.

14. The method of making the wavelength shifting fiber of claim 13, wherein the numerical aperture for the wavelength shifting fiber is at least about 0.6.

15. The method of making the wavelength shifting fiber of claim 12, wherein the plastic core comprises a material selected from the group consisting of polystyrene (PS), polyvinyltoluene (PVT), polymethyl methacrylate (PMMA), polycarbonate, and any combination thereof.

16. The method of making the wavelength shifting fiber of claim 12, wherein the plastic core precursor is heated above 240° C.

17. The method of making the wavelength shifting fiber of claim 12, wherein the method further comprises:
   applying a second liquid coating on the liquid coating after the liquid coating has been cured; and
   curing the second liquid coating.

* * * * *